(12) United States Patent  
Arthur et al.

(10) Patent No.: US 8,909,249 B2  
(45) Date of Patent: Dec. 9, 2014

(54) PASSIVE UPLINK TIME DIFFERENCE OF ARRIVAL POSITIONING AND TRACKING SYSTEM

(75) Inventors: Colin M Arthur, Edinburgh (GB); Francisco Javier Garcia, Dunfermline (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 365 days.

(21) Appl. No.: 13/408,939

(22) Filed: Feb. 29, 2012

(65) Prior Publication Data

US 2013/0225218 A1    Aug. 29, 2013

(51) Int. Cl.
*H04W 4/00*     (2009.01)
*H04W 24/00*    (2009.01)
*H04M 11/04*    (2006.01)

(52) U.S. Cl.
USPC ............ 455/456.1; 455/456.2; 455/422.1; 455/404.2; 455/456.5

(58) Field of Classification Search
CPC .............................. H04Q 7/38; H04W 24/00
USPC ............................ 455/509, 67.1, 456.1
See application file for complete search history.

(56) References Cited

U.S. PATENT DOCUMENTS

| | | | |
|---|---|---|---|
| 6,078,284 A | | 6/2000 | Levanon |
| 8,041,367 B2 * | | 10/2011 | Anderson et al. ........... 455/456.1 |
| 8,045,506 B2 * | | 10/2011 | Mia et al. ..................... 370/328 |
| 8,140,092 B2 * | | 3/2012 | Mia et al. ..................... 455/456.1 |
| 8,242,959 B2 * | | 8/2012 | Mia et al. ..................... 342/463 |
| 8,331,955 B2 * | | 12/2012 | Bull et al. ..................... 455/456.1 |
| 2004/0207556 A1 | | 10/2004 | Spilker |
| 2008/0132244 A1 | | 6/2008 | Anderson |
| 2008/0261611 A1 * | | 10/2008 | Mia et al. ..................... 455/456.1 |
| 2008/0261612 A1 * | | 10/2008 | Mia et al. ..................... 455/456.1 |
| 2008/0261613 A1 * | | 10/2008 | Anderson et al. ........... 455/456.1 |
| 2008/0261614 A1 * | | 10/2008 | Mia et al. ..................... 455/456.1 |
| 2010/0279656 A1 | | 11/2010 | Hazzani |
| 2012/0165037 A1 * | | 6/2012 | Bull et al. ..................... 455/456.1 |
| 2013/0163440 A1 * | | 6/2013 | Issakov et al. ................ 370/246 |

FOREIGN PATENT DOCUMENTS

| | | | | |
|---|---|---|---|---|
| GB | 2398963 | * | 9/2004 | ............. H04Q 7/38 |
| GB | 2398963 A | | 9/2004 | |
| WO | 2008008685 A2 | | 1/2008 | |
| WO | 2011019356 A1 | | 2/2011 | |

OTHER PUBLICATIONS

Telesoft Technologies, Hinton Locator Integration Fundamentals Application Note, 2009.
Search Report dated Jun. 24, 2013 in UK Application GB1300100.3 filed Jan. 4, 2013.

* cited by examiner

*Primary Examiner* — Tilahun B Gesesse

(57) ABSTRACT

A system that tracks a mobile transmitter within a communication system is disclosed. The mobile transmitter transmits in one or more predetermined communication slots, the communication slots being dynamically assigned by a system node in the communication system. The tracking system includes at least three uplink probes spatially separated from one another, each uplink probe measuring transmissions in each of the communication slots as a function of time. A cell monitor monitors downlink scheduling transmissions from the system node directed to the mobile transmitter, the scheduling transmissions specifying a time and communication slot to be utilized by the mobile transmitter in a subsequent transmission. A correlator receives the measured transmissions and the monitored downlink scheduling transmissions. The correlator uses the monitored downlink scheduling transmissions and the measured transmissions to determine a time at which a transmission from the mobile transmitter was detected at each of the uplink probes.

20 Claims, 2 Drawing Sheets

PASSIVE UPLINK TIME DIFFERENCE OF ARRIVAL POSITIONING AND TRACKING SYSTEM

BACKGROUND

Systems for locating mobile terminals such as cellular telephones, tablets, or other devices that communicate with cellular networks have been available for some time. These systems are useful in emergency situations as well as in the surveillance of the mobile terminals. While low cost global positioning system (GPS) receivers are incorporated in many mobile terminals, GPS alone is often insufficient to provide the desired location information and requires the cooperation of the mobile terminal and/or cellular network, which can pose challenges in surveillance settings.

GPS typically relies on the mobile terminal receiving signals from at least four satellites. The satellite signals are not always available indoors or outside in areas having large buildings that block the reception of the signals. The time to provide the first fix in a GPS can be excessive. In addition, the location determined by the GPS in the phone must be transmitted to the cellular network in response to some command that caused the mobile transmitter to activate its GPS tracking system.

Hence, systems for locating mobile terminals that rely on the cellular network infrastructure and the transmissions between the mobile terminals and the cellular stations are still utilized. The GPS data is used to enhance the location information when the GPS signals are available. Unfortunately, these systems also require the assistance of the mobile network or the mobile terminal.

For example, systems that measure the distance from the cellular tower utilize a measurement of the round trip time between the base station and the mobile terminal to determine a distance from the base station. In such systems, the mobile terminal can be localized to a ring of positions within a sector of the station or a circular area around the station. These systems depend on timing measurements that are made by the base station, and hence, require the active assistance of the base station to provide the position measurements.

A second class of systems requires the mobile terminal to observe the time difference in the arrival of pilot signals in the downlink transmission emitted by neighboring base stations, and hence, determine its own position. This system requires the mobile terminal to be within range of multiple base stations. This technique, like that of GPS, requires the mobile transmitter to make the measurement and report it via the base station. Such systems are difficult to implement when clandestine surveillance of the mobile terminal is desired.

A third class of systems utilizes so-called local measurement units (LMUs) that detect the uplink transmissions from the mobile terminals. The LMUs are located at various known points in the cell. While the LMUs are separate from the cellular system, these systems still require cooperation with the base stations. In these systems, the mobile terminals need to be influenced to transmit during idle periods and the independent cellular positioning system also needs to discover the serving base station so that LMUs in close proximity can be configured to detect the uplink mobile terminal transmissions. Paging is used to discover the serving base station during idle periods. The mobile terminal is persuaded to think it needs to execute a handover to another base station. To this end, it generates uplink-signaling transmissions that are used to determine the time difference arrival of the uplink transmissions at the appropriate LMUs. Here, again, the local cellular system needs to be involved to trigger the mobile transmitter to make the uplink transmissions in question.

Finally, even in systems in which the mobile terminal has a GPS receiver, the GPS receiver needs to be triggered to make a measurement and report that measurement back to the base station. Hence, the cellular system is needed to assist in the information triggering and the data collection.

As new cellular networks are deployed to improve the data bandwidth available to the mobile terminals, or make other improvements, the current positioning systems also need to be upgraded. This increases the cost and complexity of the cellular networks and requires the cooperation of the various cellular providers. Accordingly, a position location system that does not require the active participation of the cellular provider or the mobile terminal would be advantageous.

SUMMARY

Embodiments of the present invention includes a tracking system that tracks a mobile transmitter within a communication system in which the mobile transmitter transmits in one or more predetermined communication slots within a communication system, the communication slots being dynamically assigned by a system node in the communication system. The tracking system includes at least three uplink probes spatially separated from one another, each uplink probe measuring transmissions in each of the communication slots as a function of time. A cell monitor monitors downlink scheduling transmissions from the system node directed to the mobile transmitter, the scheduling transmissions specifying a time and communication slot to be utilized by the mobile transmitter in a subsequent transmission. A correlator receives the measured transmissions and the monitored downlink scheduling transmissions. The correlator uses the monitored downlink scheduling transmissions and the measured transmissions to determine a time at which a transmission from the mobile transmitter was detected at each of the uplink probes.

DETAILED DESCRIPTIONS

Figure 1:
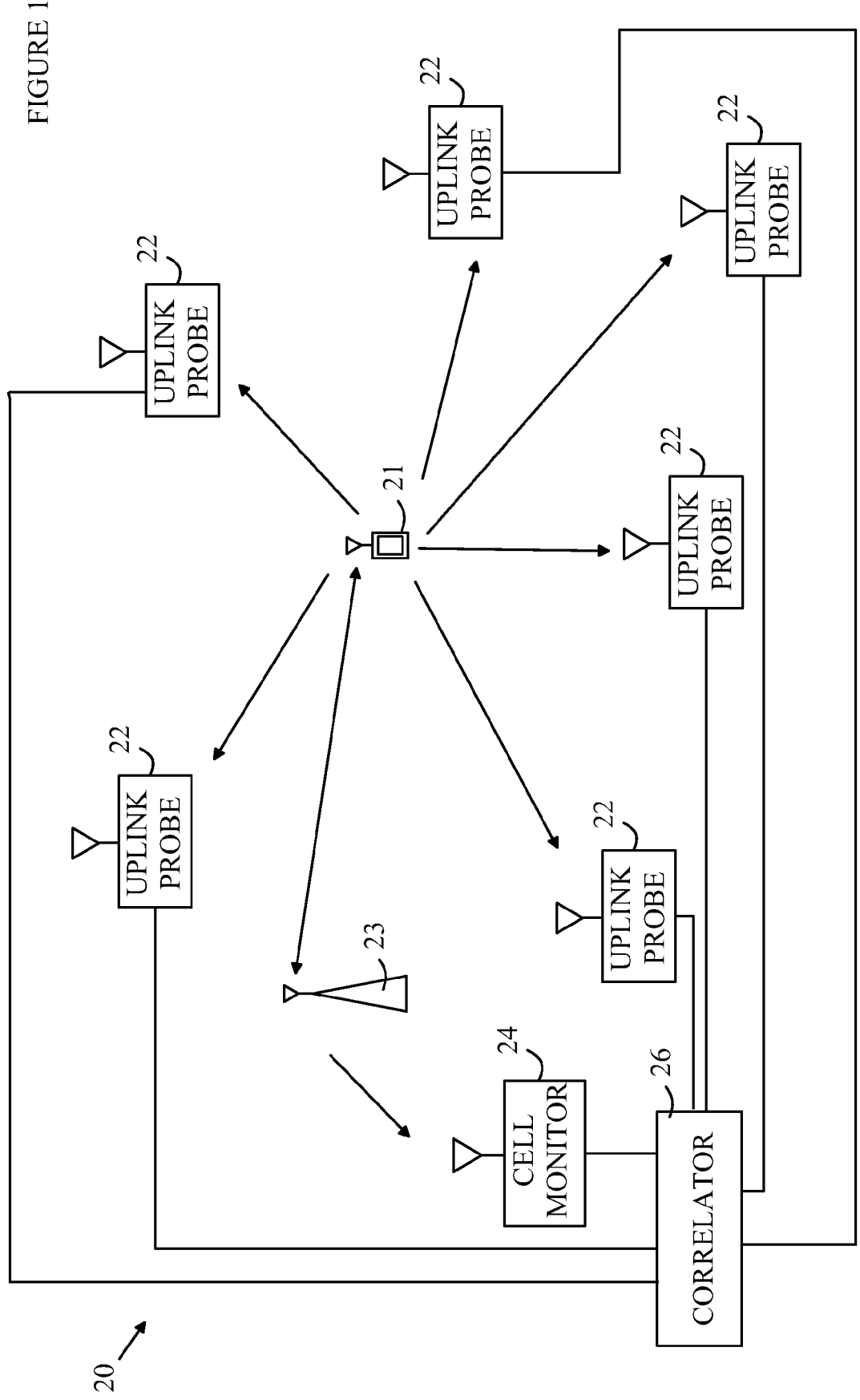
FIG. 1 illustrates the basic structure of a positioning system according to one embodiment of the present invention.

The manner in which the present invention provides its advantages can be more easily understood with reference to FIG. 1, which illustrates the basic structure of a positioning system according to one embodiment of the present invention. Positioning system 20 tracks the position of mobile transmitter 21 within a cell in which the communications are controlled by a transmission node 23. A number of uplink probes 22 are located such that at least three uplink probes can receive transmissions from mobile transmitter 21 for any given location of mobile transmitter 21 within the cell. A cell monitor 24 that is not part of the cellular system monitors the downlink messages from transmission node 23 to the various transmitters within the cell, including mobile transmitter 21.

The uplink probes are synchronized with one another. Hence, by measuring the difference in time of arrival of the uplink signals from mobile transmitter 21 with different pairs of uplink probes, the position of mobile transmitter 21 relative to the uplink probes can be determined. Methods for determining a position of a transmitter from the differences in the time of arrival of signals from that transmitter at a number of spatially separate receivers are known to the art, and hence, will not be discussed in detail here.

In general, there will be a large number of mobile transmitters within range of the uplink probes. Hence, the positioning system must be able to separate the transmissions from mobile transmitter 21 from those of other mobile transmitters or fixed terminals within range of the uplink probes. Cell monitor 24 provides the required information by monitoring the downlink transmissions from transmission node 23 to the mobile transmitters within the cell controlled by transmission node 23.

The manner in which the present invention operates can be more easily understood with respect to LTE cellular networks. Such networks are part of the evolving 4G networks; however, embodiments based on other network standards such as Mobile WiMAX can also be constructed.

In LTE networks, the transmission of any radio traffic within a cell is strictly controlled by a node, referred to as the eNode-B, in each cell. The eNode-B is responsible for all scheduling decisions, for both downlink and uplink traffic, and communicates these scheduling decisions to all mobile transmitters in the cell using a channel referred to as the Physical Downlink Control Channel (PDCCH). The eNode-B assigns Radio Network Temporary Identifier (RNTI) addresses to each mobile transmitter within the cell, and when it wishes to schedule a transmission on downlink or uplink for a particular mobile transmitter, it sends a scheduling message on the PDCCH addressed to that mobile transmitter's RNTI.

Figure 2:
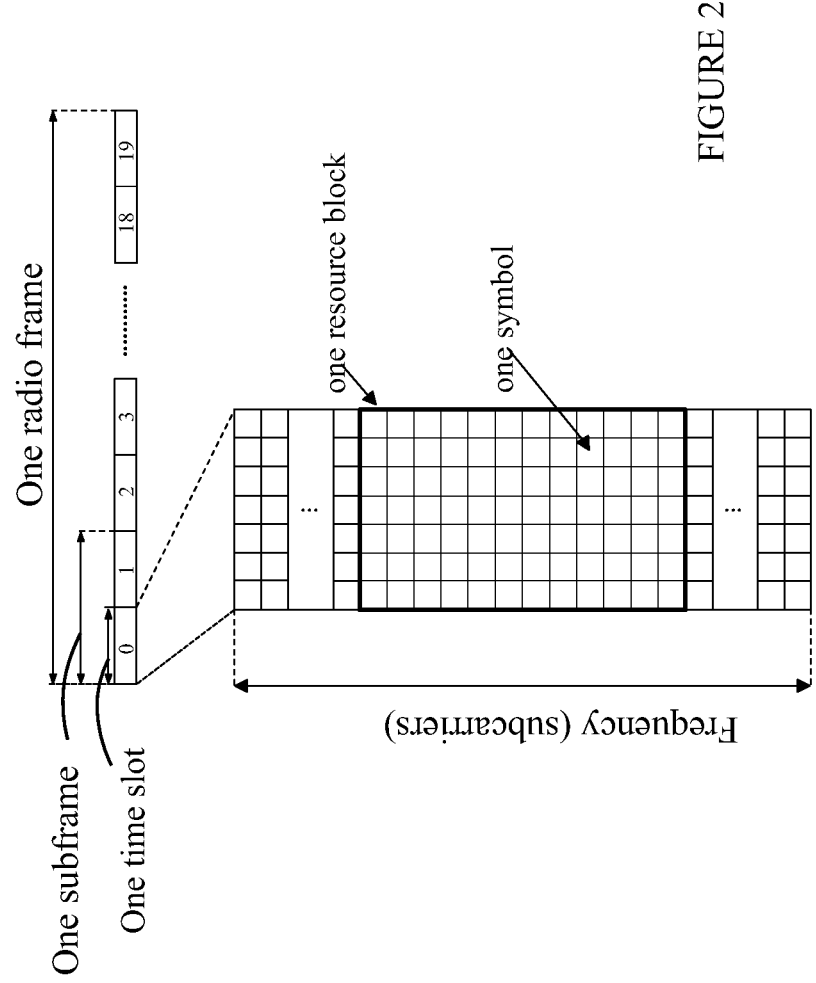
FIG. 2 illustrates the organization of the uplink transmissions in an LTE network.

Refer now to FIG. 2, which illustrates the organization of the uplink transmissions in an LTE network. The transmissions are organized into radio frames. Each frame includes ten sub-frames, and each sub-frame includes two time slots. Each time slot is divided into a plurality of symbol transmission periods. The frequency band assigned to the cell is likewise divided into a plurality of resource blocks with each resource block being further divided into a plurality of sub-carriers. A resource block can be viewed as a band of sub-carriers that is typically 12 sub-carriers wide and extends in time for one slot. During each transmission, the transmitter sends a plurality of symbols on each sub-carrier.

The number of symbols in each slot, the number of resource blocks, and the number of sub-carriers in each resource block vary depending on the specific LTE network implementation. In general, in an LTE network, a mobile transmitter will be assigned one or more resource blocks and one or more time slots. For the purposes of this discussion, it is sufficient to note that the resource blocks are assigned to the transmitters in a cell on a frame-by-frame basis. The mobile transmitter transmits a predetermined number of symbols on each sub-carrier assigned to it during the corresponding time slot in the frame.

For radio transmissions sent on the uplink (mobile transmitter to eNode-B), the eNode-B will send "Downlink Control Information Format 0" (DCI0) messages on the PDCCH, to instruct the mobile transmitters when and where they should transmit. These DCI0 messages indicate which resource blocks the mobile transmitter should use in a specified future frame.

The information in this message that is used by the present invention is the information that allows the system to identify the scheduled uplink transmissions of interest. In one aspect of the invention, the cell monitor creates a scheduling record (SR) for each observed DCI0 message. The SR includes the identification number of the mobile transmitter, and the exact time, frequencies at which the mobile transmitter should transmit, and the time at which the DCI0 message was received at the cell monitor. In an LTE network, the total bandwidth of uplink sub-carriers is divided into groups called "Resource Blocks" (RBs). Each RB represents a set of contiguous sub-carriers and contiguous symbols that are sent on that sub-carrier in a given uplink frame. Each uplink frame has a predetermined number of resource blocks that are divided between the various transmitters in the cell on a frame-by-frame basis.

Therefore, when assigning allocations to a mobile transmitter for transmission, the smallest amount of RF resources which can be allocated is a single RB. This allows for the spectrum of the uplink to be divided into a grid-like structure that simplifies the assignment of resources. The DCI0 message specifies the allocation of resource blocks within a future frame to a specific mobile transmitter. The future frame is specified by an offset from the current frame. For example, the message could specify that the mobile transmitter is assigned a particular group of RBs in the frame that is four frames from the current frame.

The uplink probes monitor the frequency spectrum assigned to the uplink transmissions in the network to determine when a transmission from a mobile transmitter is received at the uplink probe. Since the transmissions are assigned in RBs and time slots, the uplink probe need only monitor the frequencies at which each RB is transmitted and determine the time at which that uplink probe observed the start of a transmission in each time slot. The transmissions corresponding to each RB are determined without regard to the identity of the transmitter. This information is then transmitted to a third entity, referred to as the correlator. The correlator matches the information from the uplink probes with the scheduling records obtained from the cell monitor to identify a time at which a transmission from a particular mobile transmitter was received at the uplink probe.

In one aspect of the invention, the uplink probes shown in FIG. 1 detect which sub-carriers within an LTE bandwidth were active at particular times. Each uplink probe creates an "Observation Record" (OR) data object for each sub-frame of LTE traffic that is observed. This OR conveys which sub-carriers were energized with power at which specific symbol times. In one aspect of the invention, the OR for an LTE network frame includes an accurate timestamp of when the sub-frame was observed, a description of which sub-carriers or which RBs were active in the first slot of that sub-frame with an accurate timestamp of exactly when each sub-carrier or RB became active, a description of which sub-carriers or which RBs were active in the second slot of that sub-frame with an accurate timestamp of exactly when each subcarrier or RB became active, and the geographic location of the uplink probe expressed in some coordinate system whereby it can be compared accurately with other probes within the cell.

In one embodiment of the present invention, correlator 26 shown in FIG. 1 receives the SRs and ORs. Correlator 26 is responsible for analyzing and comparing SRs and ORs, once these records have arrived at the correlator. Through the use of the timestamps applied to both types of records, correlator 26 constructs a representation of what was scheduled in the cell, and what was observed at each uplink probe at any particular time.

In one aspect of the invention, correlator 26 first parses the SRs. The timestamps of each SR will allow for the sorting of the records, and allow the correlator to build up a "Scheduling Map" of which mobile transmitters were scheduled to transmit on which particular RB at any particular time. The scheduling map will take into account scheduling rules that specify which future sub-frames are being scheduled in any particular DCI0 message. For example, in an FDD LTE cell, the DCI0 messages at sub-frame x indicate the scheduling for sub-frame x+4.

The scheduling map can be reduced by filtering out SRs that do not involve a mobile transmitter of interest, i.e., records that do not specify a transmission for a particular identification number of the mobile transmitter of interest assigned within the cell. If there are multiple mobile transmitters of interest, a map can be constructed for each mobile transmitter of interest.

A similar process is performed for each of the uplink probes which has returned an OR data object to correlator 26. In one aspect of the invention, for each uplink probe, correlator 26 constructs an "Observation Map" which describes which RBs within the LTE spectrum were observed to be active in a particular frame and time slot and the time at which the RB was received at the uplink probe.

Once both the scheduling map and the observation map have been calculated for a particular area of interest, a process of correlation can be applied. Assume that the scheduling map corresponding to a particular frame indicates that the mobile transmitter of interest has been assigned RBs 0, 1, and 2 in the current frame. As noted above, the SR in question may be one created from a downlink sub-frame several sub-frames earlier.

Correlator 26 then examines the OR map for each uplink probe corresponding to the current sub-frame to determine if RBs 0, 1, and 2 were active. It should be noted that not all uplink probes would, in general, be positioned to receive transmissions from any particular location within the cell. The time at which the transmissions of interest were observed in the RBs of interest are then determined and used to compute the location of the mobile transmitter using a time difference of arrival algorithm.

The correlator could be part of the cell monitor or a separate unit that services a number of cells. The cell monitor can be constructed from a modified mobile transmitter for the cellular system in question. The correlator, on the other hand, can require significantly more computing power than a mobile transmitter such as a smart phone.

In some applications, the position information is not required in real time. For example, if an employer wants a record of the locations of an employee to verify a work schedule, position data could be generated in the evening hours using computing facilities that would normally be idle.

The above-described embodiments utilize RNTI identification numbers for each of the mobile units in the SRs. However, the tracking system, in general, prefers to track mobile transmitters in terms of their permanent identifier (IMSI number). Hence, some method for providing the correspondence between the RNTIs used in a particular cell and the IMSIs of the mobile transmitter would be advantageous. The process of correlating the SR/OR records with the IMSIs can be performed in a number of ways.

First, the correlator can get this information directly from the node in the cellular system in response to a query to that node if the tracking system has the cooperation of the cellular system. Although this requirement requires the assistance of the node, a requirement that nodes share this information with authorized cell monitors could be mandated by a relevant agency. The system would still remain covert with respect to the user of the mobile transmitter, as no additional signaling or transmissions are required from the mobile transmitter.

Second, the cell monitors could be programmed to listen for the "sign-in" messages and responses that are transmitted when a new mobile transmitter enters the cell. This message exchange includes the identification of the mobile transmitter in terms of its IMSI and the RNTI assigned to it for communications in that cell. The cell monitor can extract these assignments, timestamp the information, and create a separate assignment record with the assignment information.

The correlator can provide the translation by using the assignment records to create a correspondence table that maps the RNTI values to IMSI values for specified time intervals.

In principle, the cell monitor could make the translation to IMSI and use the IMSI in the SR records. However, this increases the computational load on the cellular monitors. In contrast, the correlator can service a number of different cells, and hence, the increased computational load is less of a burden.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A tracking system that tracks a mobile transmitter, said tracking system comprising:
    at least three uplink probes spatially separated from one another, each uplink probe measuring transmissions in each of a predetermined number of communication slots as a function of time;
    a cell monitor that monitors downlink scheduling transmissions from a system node directed to said mobile transmitter, said scheduling transmissions specifying a time and at least one of said communication slots to be utilized by said mobile transmitter in a subsequent transmission; and
    a correlator that receives said measured transmissions and said monitored downlink scheduling transmissions, said correlator using said monitored downlink scheduling transmissions and said measured transmissions to determine a time at which a transmission from said mobile transmitter was detected at each of said uplink probes.

2. The system of claim 1 wherein said uplink probes are synchronized with one another.

3. The system of claim 1 wherein said communication system utilizes a plurality of sub-carrier frequencies, each communication slot corresponding to a predetermined sub-carrier frequency, wherein each slot corresponds to a predetermined time interval on one of said carrier frequencies, and wherein each of said uplink probes generates an observation record that indicates those sub-carriers that were energized during each of said slots in a predetermined block of slots, said observation records being communicated to said correlator.

4. The system of claim 3 wherein said cell monitor generates a scheduling record for each downlink scheduling transmission, said scheduling record comprising an identification number specifying which transmitter in said communication system to which said downlink scheduling transmission was directed, a timestamp identifying a time at which said scheduling transmission was sent, information specifying which slots are assigned to that mobile transmitter in an upcoming transmission, said scheduling records being communicated to said correlator.

5. The system of claim 4 wherein multiple mobile transmitters are transmitting within said communication system, wherein only some of said mobile transmitters are to be tracked, and wherein said correlator discards scheduling records that do not correspond to a mobile transmitter that is to be tracked.

6. The system of claim 5 wherein said correlator also discards observation records that do not correspond to a mobile that is to be tracked.

7. The system of claim 1 wherein said communication system comprises a cellular communication system, and wherein said cell monitor monitors a particular cell in said communication system.

8. The system of claim 7 wherein said cellular communication system is an LTE communication system, and wherein said cell monitor monitors an eNode-B in one of said cells.

9. The system of claim 7 wherein said correlator is at a location that is outside said cell.

10. The system of claim 1 wherein said correlator processes scheduling transmissions from a plurality of cell monitors.

11. A method for tracking a mobile transmitter that transmits in one or more predetermined communication slots within a communication system in which transmitters are dynamically assigned communication slots by a system node, said tracking method comprising:
   measuring transmissions in each of said communication slots as a function of time at three spatially separated locations using three uplink probes;
   monitoring downlink scheduling transmissions from said system node directed to said mobile transmitter, said scheduling transmissions specifying a time and communication slot to be utilized by said mobile transmitter in a subsequent transmission; and
   determining a time at which a transmission from said mobile transmitter was detected at each of said uplink probes using said monitored scheduling transmissions.

12. The method of claim 11 wherein said uplink probes are synchronized with one another.

13. The method of claim 11 wherein said communication system utilizes a plurality of sub-carrier frequencies, each communication slot corresponding to a predetermined sub-carrier frequency, wherein each slot corresponds to a predetermined time interval on one of said carrier frequencies, and wherein each of said uplink probes generates an observation record that indicates those sub-carriers that were energized during each of said slots in a predetermined block of slots, said observation records being communicated to a correlator that determines said time.

14. The method of claim 13 wherein monitoring said downlink scheduling transmission comprises generating a scheduling record for each downlink scheduling transmission, said scheduling record comprising an identification number specifying which transmitter in said communication method to which said downlink scheduling transmission was directed, a timestamp identifying a time at which said scheduling transmission was sent, information specifying which slots are assigned to that mobile transmitter in an upcoming transmission, said scheduling records being communicated to said correlator.

15. The method of claim 14 wherein multiple mobile transmitters are transmitting within said communication system, wherein only some of said mobile transmitters are to be tracked, and wherein said correlator discards scheduling records that do not correspond to a mobile transmitter that is to be tracked.

16. The method of claim 15 wherein said correlator also discards observation records that do not correspond to a mobile that is to be tracked.

17. The method of claim 11 wherein said communication system comprises a cellular communication system, and wherein said monitoring of downlink scheduling transmissions is performed on a particular cell in said communication system.

18. The method of claim 17 wherein said cellular communication system is an LTE communication system, and wherein said monitoring of downlink scheduling transmissions is performed on a transmission from an eNode-B in one of said cells.

19. The method of claim 17 wherein said correlator is at a location that is outside said cell.

20. The method of claim 11 wherein said correlator processes scheduling transmissions from a plurality of cell monitors.

\* \* \* \* \*